United States Patent [19]
Osterle et al.

[11] Patent Number: 5,934,855
[45] Date of Patent: *Aug. 10, 1999

[54] LARGE-AREA WASHER

[75] Inventors: Helmut Osterle, Feldkirch, Austria; Stefan Baumgartner, Altstatten, Switzerland

[73] Assignee: SFS Industrie Holding AG, Heerbrugg, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/652,589

[22] Filed: Jun. 7, 1996

[30] Foreign Application Priority Data

Dec. 10, 1993 [DE] Germany .................. P 43 42 261.6

[51] Int. Cl.⁶ .................. F16B 43/00; F16B 39/24; E04B 7/00
[52] U.S. Cl. .................. 411/545; 411/160; 411/531; 405/302.1
[58] Field of Search .................. 411/160, 161, 411/531, 533, 535, 545, 546; 405/302.1

[56] References Cited

U.S. PATENT DOCUMENTS

| 1,362,623 | 12/1920 | Hachberger | 411/531 |
|---|---|---|---|
| 3,196,919 | 7/1965 | Poopitch | 411/160 |
| 4,507,020 | 3/1985 | Zeitler et al. | 405/302.1 |
| 4,726,164 | 2/1988 | Reinwall et al. | |
| 4,763,456 | 8/1988 | Giannuzzi | |
| 4,787,188 | 11/1988 | Murphy | 411/531 |
| 5,042,142 | 8/1991 | Beach et al. | |
| 5,056,684 | 10/1991 | Beach et al. | |
| 5,069,589 | 12/1991 | Lemke | 411/160 |
| 5,350,265 | 9/1994 | Kinner | 411/160 |
| 5,803,693 | 9/1998 | Choiniere et al. | 411/545 X |

FOREIGN PATENT DOCUMENTS

| 0 256 589 | 2/1988 | European Pat. Off. . |
|---|---|---|
| 2-295111 | 12/1990 | Japan . |
| 4-286369 | 10/1992 | Japan . |
| 608080 | 12/1978 | Switzerland . |

*Primary Examiner*—Michael F. Trettel
*Assistant Examiner*—Robert G. Santos
*Attorney, Agent, or Firm*—Helfgott & Karas, P.C.

[57] ABSTRACT

A large-surface plain washer (1) has an opening (5) for inserting a fastener. Engagement elements (1) that increase the engagement with a plate and/r web to be fastened are provided at the surface of the washer (1) that faces in the fastening direction. In addition, projecting spacers (17) shaped as tongues (26) that become effective when several washers (1) are stacked are provided at the lower side of the washer (1). The free end of these tongues (26) may be supported on the top side of the plain washer located directly underneath, so that the washers may be stacked without causing the engagement elements (13) of different washers (1) to engage each other. Individual washers (1) may thus be easily separated from a stack of washers (1), either by rotating or by moving the lowermost washer.

19 Claims, 6 Drawing Sheets

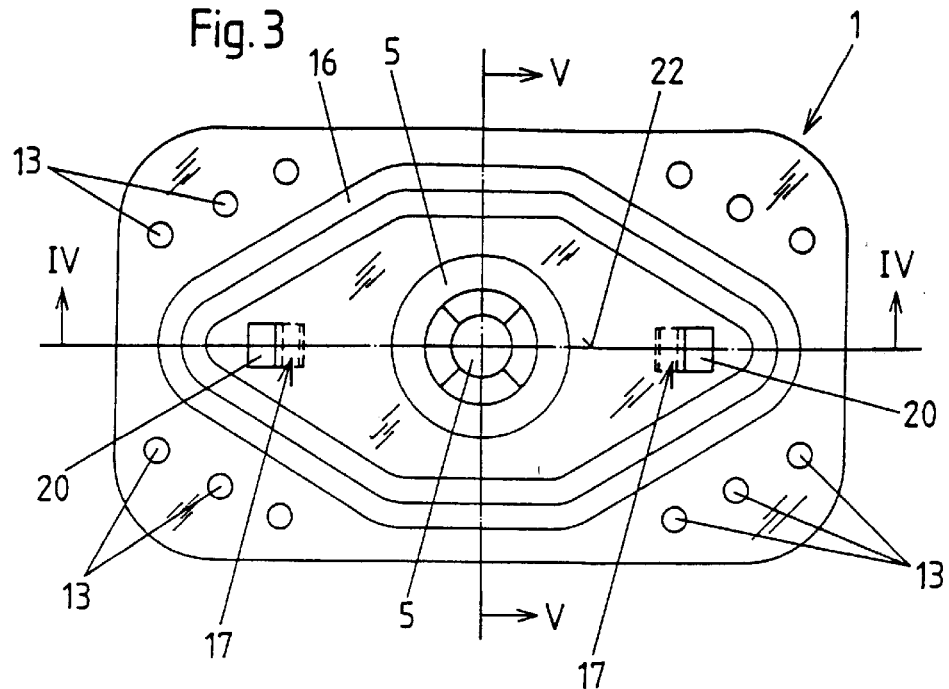
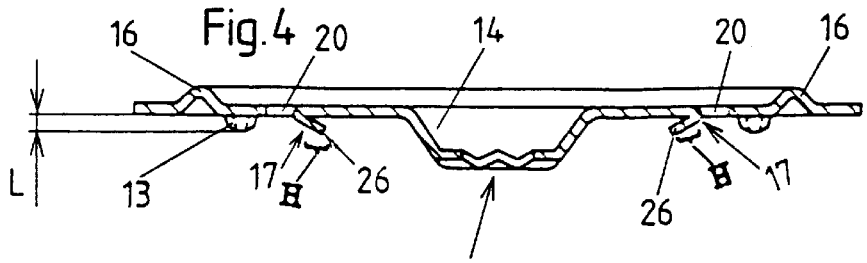
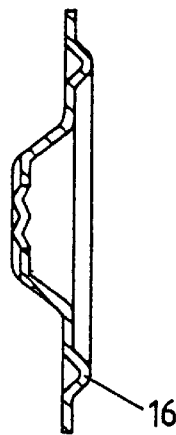

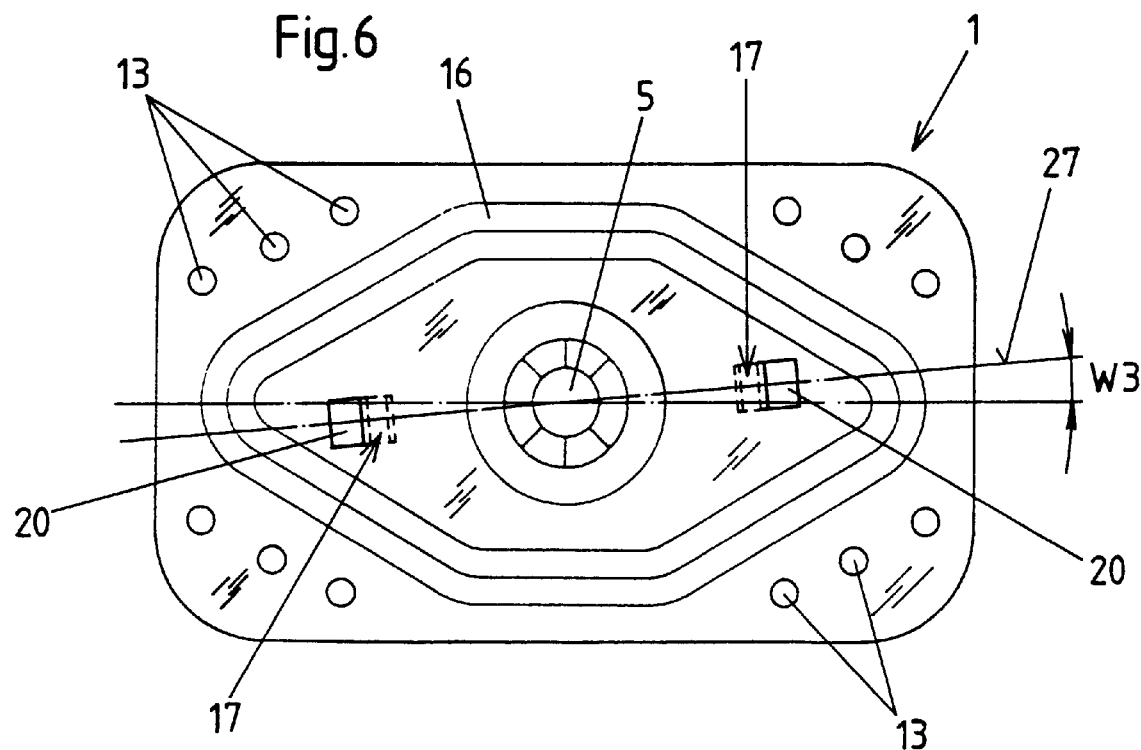
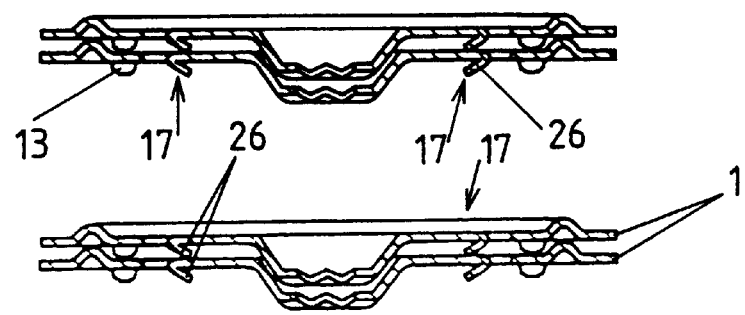

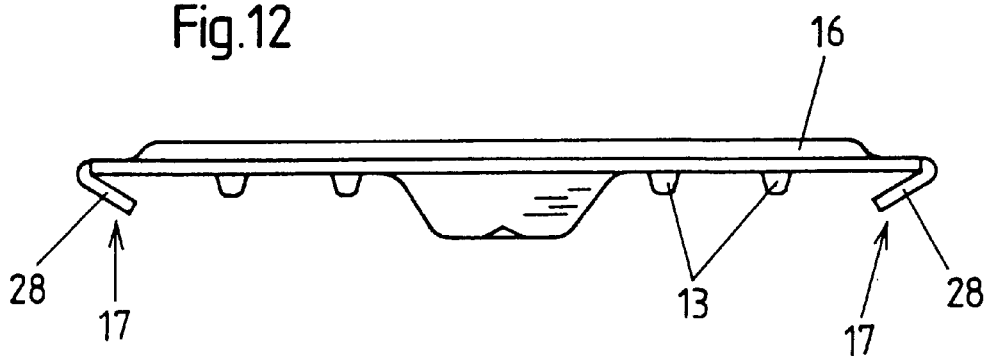
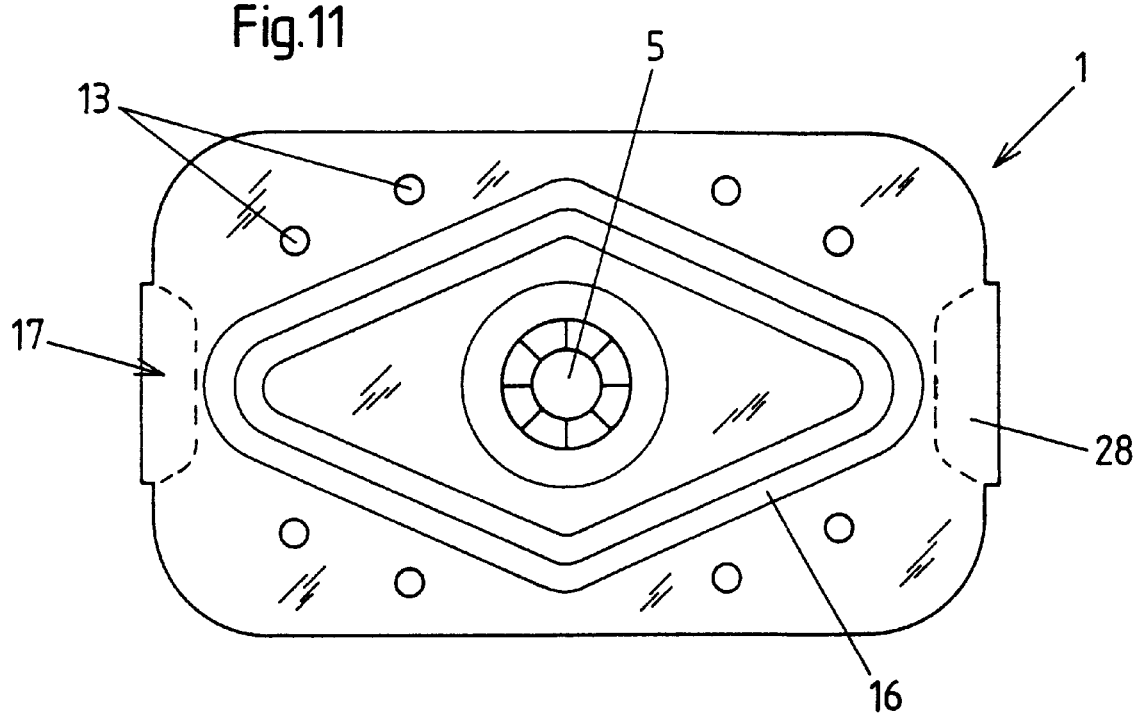

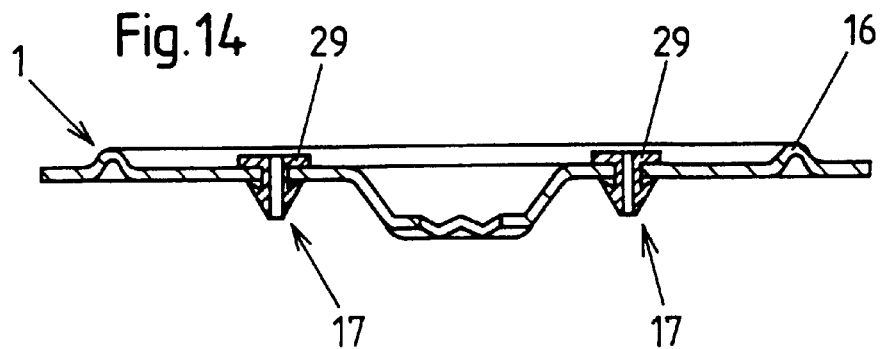
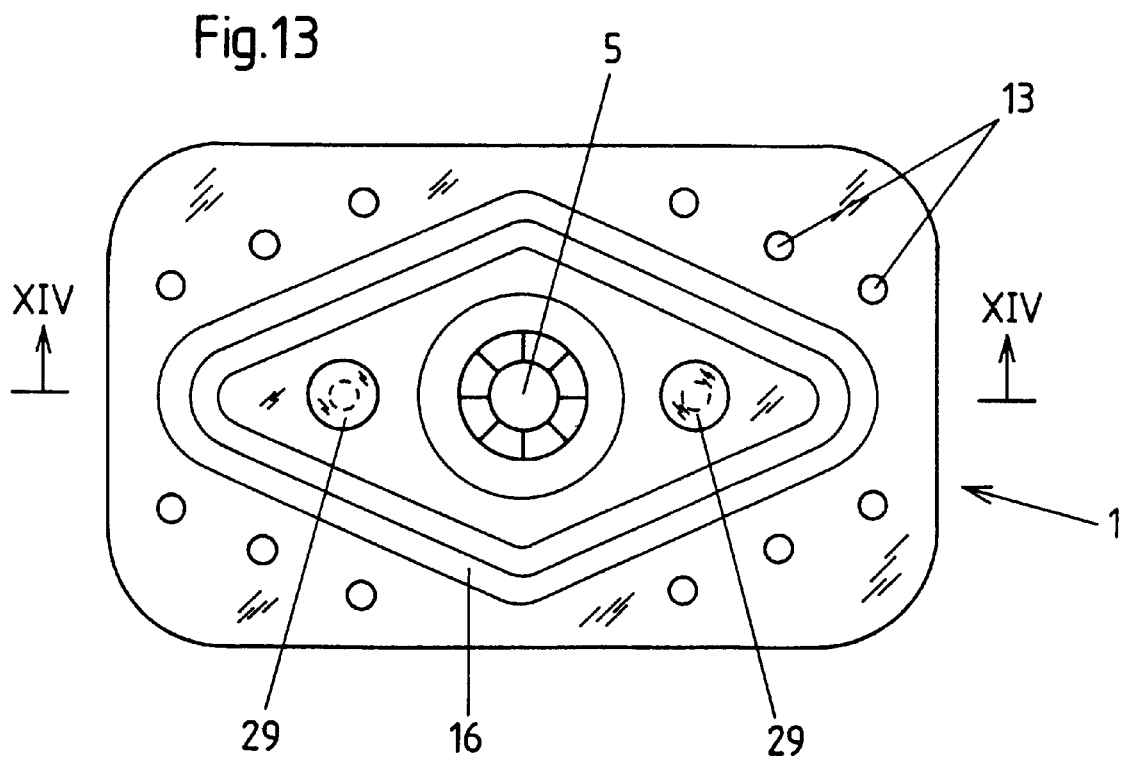

LARGE-AREA WASHER

BACKGROUND OF THE INVENTION

The invention relates to a large-area washer for fastening roofing sheets or the like.

Such a washer is known from U.S. Pat. Nos. 4,763,456 and 4,787,188.

Such washers are usually used to fasten single layers or multilayers of roofing sheets and/or an insulating layer on a solid foundation. In order to achieve appropriate fastening of the covering roofing sheet, points, which are aligned in the fastening direction, are provided at the underside of the large-area washer known from the U.S. Pat. No. 4,763,456 and indentations, pointing in the fastening direction, are provided at the underside of the large-area washer known from U.S. Pat. No. 4,787,188. The points and indentations are provided as protruding elements and thus are contacting elements, which pierce the roofing sheet. They are thus elements, which mesh with the roofing sheet without piercing it and thus merely increase the friction between the roofing sheet and the washer. Relatively high forces arise due to corresponding suction loads on the roofing sheet, so that the endeavor exists to pull out the roofing sheet under the fastener or under the washer. The elements, which protrude from the underside of the washers and improve the meshing or improve the friction, are intended to ensure a corresponding reliability of the fastening site.

On the other hand, the necessity exists of being able to make screwed connections on an inclined or flat roof by machine, for which some form of magazine for the screws as well as the washers is required. Since stacking represents the most effective type of magazining, also when regarded from the point of view of the space required, problems arise with the elements, which protrude from the washers. For singling the washers in appropriate screwing equipment, it is necessary that the washers, which are stacked on top of one another, or at least the washer at the bottom, can be shifted or twisted with respect to the stack above. The protruding elements, which are provided to increase the friction or the meshing, are an obstacle.

The same problem also exists with a known washer (German Auslegeschrift 12 69 840), for which indentations with tabs, which can also be an obstacle to the singling of washers stacked on top of one another, are provided as spacers.

SUMMARY OF THE INVENTION

It is therefore an object of the invention to construct a large area washer of the initially-described type in such a manner that, despite the presence of protruding elements for increasing the friction or the meshing, the washers can be singled in a simple manner from a stacked arrangement, that is, they can be shifted or twisted relative to one or several washers lying above them.

By means of the present invention, additional spacers are thus provided for a large area washer and ensure that the protruding elements, which are provided to increase the friction or the meshing, do not exert an interfering effect on the upper side of the washer below. This is of particular advantage especially for large-area washers, for which the protruding elements, which are provided to increase friction, consist of a coating. The possibility therefore exists of twisting stacked washers relative to one another about their center axis or optionally of mutually shifting such washers in the longitudinal direction, without the elements, which protrude from the washers and are provided to increase friction or meshing, being able to have an interfering effect on the respective washer below. This is of particular importance especially when the washers are galvanized or provided with a different surface treatment.

The inventive measures thus relate to a special development of a washer, which makes optimum stacking of several washers in an appropriate processing device possible, so that a very simple and trouble-free singling can then take place in this processing device.

The inventive measures can also be brought about by relatively simple technical means. A variation of the embodiment provides that the spacers are constructed as brackets, which are stamped out of the washer and bent upward or downward. This is a very simple solution, with which optimum mutual support of the washers, stacked on top of one another, is possible. In this connection, it is effective if the bent brackets and the thereby formed holes in each case have a rectangular shape. This results in a relatively long supporting edge at the free protruding edge of the bracket, so that tilting of the washer in a stack is prevented optimally.

A further development provides that, for forming spacers on two opposite edges of a rectangular hole, brackets are bent downward and upward. In this connection, it would also be conceivable that the bracket is bent up at one edge and down at the opposite edge. A relatively stable support, which is not likely to tilt, results from two spacers, which are disposed at a short distance from one another and which are present, of course, in several but at least two versions.

Especially when a washer is used with a central opening through which a fastener can pass, it is advisable that at least one spacer is constructed or disposed on either side of the opening in the washer for accommodating a fastener. Accordingly, appropriate support for mutual spacing is provided from the center of the washer in two directions.

According to a special, possible embodiment, the opening and the at least two spaces lie on the common central longitudinal axis of the washer. This solution appears to be the simplest from a manufacturing point of view. However, in order to take into consideration an appropriate matching to the stiffening elements, such as beads or the like, which are present on the spacer, additional variations of the embodiment may be advantageous in order to make possible a sufficiently large twisting or shifting region for two washers, which are stacked on top of one another. According to such a variation, an axis, passing through the opening and the at least two spacers, is twisted relative to the central longitudinal axis of the washer up to an acute angle of about 10° and preferably of about 5°. A significantly larger twisting angle of the washers, which are to be stacked on top of one another, is then possible without the spacers coming into engagement with stiffening elements that may be present.

A further possible solution provides that the distance of the two spacers from the two side of the opening is different. This variation of the embodiment can be of advantage if there are special requirements for singling the washers.

In an embodiment, which is advantageous for manufacturing reasons, the spacers, which are constructed as brackets, are aligned at right angles to the plane of the washer. Wherever such an embodiment can be used, it appears to be the most advisable manufacturing form. However, especially when care must be taken that, when stacking washers, the respective spacers cannot engage the corresponding holes of the next washer, additional measures are required. If namely the spacers can engage a corresponding hole on the next washer, then the effect of the spacer is lost, since the projecting elements then once again engage the upper side of the next washer. In this case, it is proposed, that the spacers, which are constructed as a bracket, be inclined acutely to the plane of the washer. In this connection, it is probably most advantageous that the spacers, which are constructed as a bracket, are inclined acutely to the plane of the washer in the direction averted from the hole formed in the washer. It is then assured at all times that the brackets are supported on a solid material section of the subsequent washer and cannot, under any circumstances, engage the hole formed by bending the bracket.

According to a further variation of the embodiment, the spacers are formed by sections bent from the outer edge of the washer. Correspondingly shorter or longer sections can thus be bent at the edge region of the washer and ensure that the washers are mutually supported especially by these sections as spacers and, with that, prevent the protruding elements being supported on the upper side of the washer that follows next.

If the spacers are formed by sections or tabs, bent at the outer corners, then considerable savings of material can be achieved in this way, since material is used for such tabs, which otherwise would be cut off in the bent corner region during the production of the washer. For such a construction, just as for the formation at the side edges, it is possible that the spacers, formed at the outer edge of the washer, are bent to form an acute angle with the inner region of the washer. In this connection, these spacers can be bent upward as well as downward with respect to the plane of the washer.

According to a further constructive design in this connection, the spacers, formed at the outer edge of the washer, are bent over completely so that their thickness, lying on the underside or the upper side of the washer, forms the height of the spacer. This is surely advisable when the height of the protruding element is relatively low. After all, it need merely be assured that, during a stacking of the washers, the protruding elements are not seated on the washer below and do not damage the surface or prevent a proper singling in a processing machine.

According to a further variation, the spacers are formed by separately manufactured parts, which are inserted in the openings on the washer and held, for example, by a press fit or by elastic locking elements. For example, for the production of washers from metal by a stamping process, appropriate openings can be stamped to begin with and spacers, manufactured separately are then pressed into and fixed in these openings when necessary. Such a development surely is also meaningful if the washers are to be used with as well as without spacers. For the simple type of application, it is then sufficient to provide an appropriate opening, into which locking elements can be inserted when necessary.

BRIEF DESCRIPTION OF THE DRAWINGS

Examples of the invention are described in greater detail in the following by means of the drawing, in which FIG. 3 shows a plan view of a large area washer, FIG. 4 shows a section along the line IV—IV in FIG. 3, FIG. 5 shows a section along the line V—V in FIG. 3, FIG. 6 shows a plan view of a washer of FIG. 3, for which, however, the design has been changed from that of FIG. 3, FIG. 7 shows a stack of washers of the construction of FIG. 3 or 6, the function of the spacers being visible, FIG. 11 shows a plan view of a different embodiment of a washer, FIG. 12 shows a side view of this washer, FIG. 13 shows a plan view of a different embodiment of the washer, FIG. 14 shows a section through this washer along the line XIV—XIV of FIG. 3.

DESCRIPTION OF THE PREFERRED EMBODIMENTS

Figure 1:
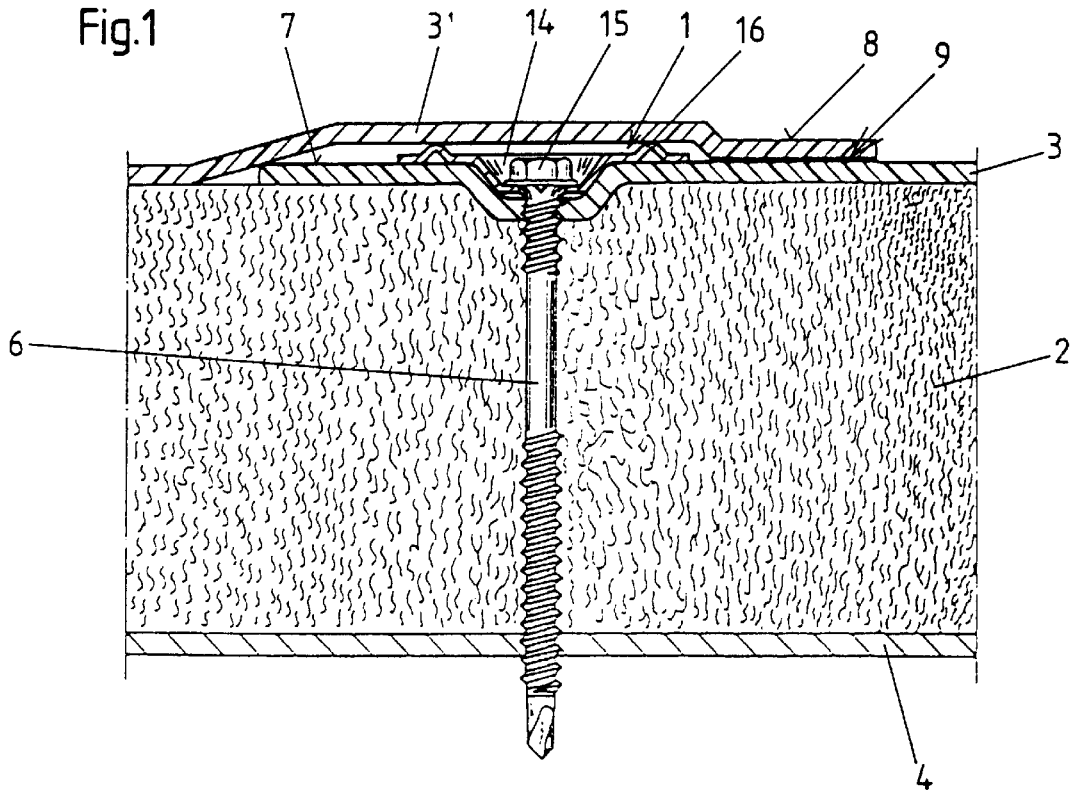
FIG. 1 shows a section through an example, in which a large area washer is used to fasten insulating areas and roofing sheets.

A large area washer 1 is used to fasten an insulating area 2 and a roofing sheet 3, which covers the insulating layer 2, on a solid foundation 4. A fastener 6, which in this case is constructed as a screw, is introduced into a central hole 5. The roofing sheet 3 is fastened in each case at an edge region 7, the edge region 8 of a subsequent roofing sheet 3' covering the site of the screw connection. The roofing sheets 3 and 3' are then glued or welded together in region 9. The fastening itself therefore is in a region, which is sealed from the outside.

Figure 2:
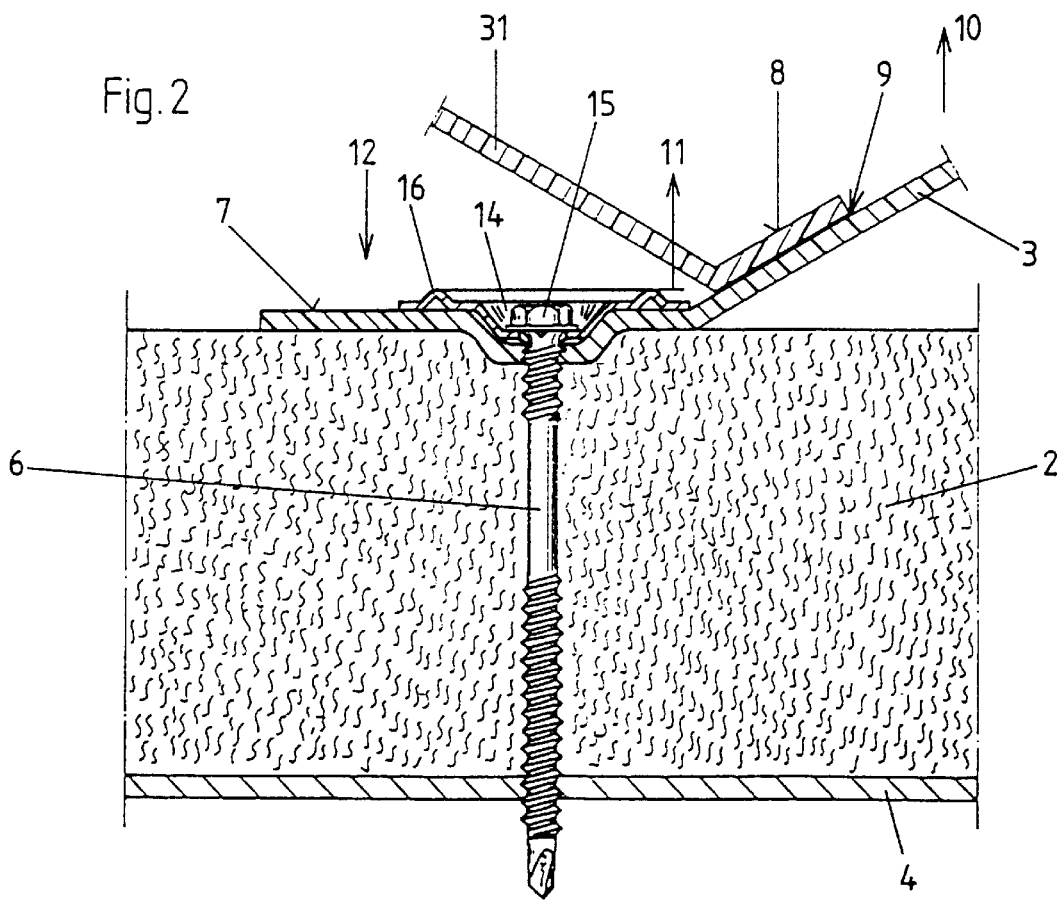
FIG. 2 shows the same use as FIG. 1; however, there are appropriate forces acting on the roofing sheet.

If now, as can be inferred from FIG. 2, the roofing sheets 3, 3' are pulled upward by suction forces acting in the direction of arrow 10, then corresponding forces act on the screw connection and, especially also, on the washer 1. The region of the washer 1 on the right side of the Figure is pulled upward in the arrow direction 11; on the other hand, the region of the washer 1 in the left part of the Figure is pressed downward in arrow direction 12. When there is such an extreme attack of forces, this edge region of the roofing sheet 3 shall be held securely underneath the washer 1. For this purpose, a special arrangement and construction is required of elements 13, which protrude at the underside of the washer 1 and can be manufactured and disposed in various ways. Instead of the elements 13, which are constructed here as protruding, meshing elements, an appropriate coating with optionally rough or finely grained inclusions can also be provided in order to increase by these means the friction of the underside of the washer with respect to the roofing sheet. Aside from increasing the friction, the meshing is also improved further with appropriate meshing elements, so that correspondingly larger forces can be transferred between the washer and the roofing sheet.

Usually, in the case of such washers, the problem then arises that the washers, lying ready in a stack, due to the corresponding arrangement of meshing elements 13 or a corresponding coating, can be processed only very poorly or with malfunctioning in a processing device such as a screw-driving device. From such a stack of washers, it must then always be possible to single out the lowest washer without obstruction from the stack above and without interference to arranging the lowest washer in the position below the axis of the screw.

For the washer of FIGS. 3 to 5, provisions are made, for instance, that the opening 5 for accommodating the fastener 6 is disposed in a depression 14, which ensures that the head 15 of the screw is accommodated in a countersunk manner. For stiffening the washer 1, a peripheral stiffening element 16, in the form of an upwards directed bead, is provided for the example shown. The stiffening element 16 can, of course, be constructed in various ways; within the meaning of the present invention, it is not necessary that a peripherally-closed, continuous bead be present here.

In order to provide spacers 17, which are effective for stacking several washers 1, brackets 26, which are stamped out of the washer 1 and bent upward, are present in the example shown in FIGS. 3 and 5 and also in the construction of FIG. 6. These brackets leave behind a hole 20 with a rectangular shape, the bracket 26 itself also having a rectangular shape and thus ensuring a linear support as spacer 17 at its free end. The height H of the brackets 26, from its foot up to the highest elevation away from the washer 1 is equal to or greater than the height L of the elements 13 protruding at the underside of the washer 1. For the embodiment shown, the brackets 26 are bent downward, that is, in the fastening direction. It would, however, also be conceivable to provide brackets 26, which are bent upward, as spacers 17. In such a case, however, longer brackets or brackets provided in a different arrangement should be used under some circumstances, depending on the arrangement of the stiffening elements 16 in the form of the usual beads.

In this connection, it would, however, also be conceivable that, for forming spacers 17, brackets 26 are provided, which are bent downward or upward at two opposite edges of a rectangular hole 20.

As can be seen especially for the embodiments of FIGS. 3 to 6, at least one spacer 17 is formed or disposed on either side of the opening 5 in a main body of the washer 1 for accommodating the fastener. Despite the fact that there are only two spacers 17, much security is then provided against tilting when appropriately many washers are stacked on top of one another. In addition to this, assurance is nevertheless provided that the washers can be mutually singled, that is, twisted relative to one another or mutually shifted in the longitudinal or transverse direction by an appropriate amount.

For the embodiment of FIG. 3, it can be seen that the opening 5 and the at least two spacers 17 lie on the common central, longitudinal axis 22 of the washer 1. So that, particularly for a special arrangement of the stiffening elements 16, as shown in FIG. 6, a further mutual twisting of the washers, which are stacked on top of one another, is possible, provisions are made, particularly for the embodiment of FIG. 6, that an axis 27, placed through the opening 5 and the at least two spacers 17, is twisted by up to an acute an angle of about 10° and preferably of about 5° relative to the central longitudinal axis 22 of the washer 1. With that, a greater swiveling range can be achieved in one direction, that is, depending on the construction of the singling device.

In this connection, it would also be possible, especially in adaptation to different design variations of a washer, to dispose the two spacers 17 at different distances from the sides of the opening 5.

For the embodiment shown in FIGS. 3 to 6, the spacers 17, which are constructed as brackets 26, are inclined at an acute angle to the plane of the washer 1. A slope towards the one, as well as towards the other side is possible. However, particularly in view of the fact that the free end of the bracket 28 may dip into the hole 20 of the washer below, it appears to be advantageous if the bracket is inclined in the direction averted from the hole 20 formed in the washer. With that, it is ensured that the brackets 26 cannot or, at least, cannot together engage the assigned holes 20. This is also aided by the fact that the two brackets 26 are inclined on either side of the opening 5 in the direction towards one another.

For different variations of the embodiment, it would also be entirely conceivable that the spacers 17, constructed as brackets 26, are aligned at right angles to the plane of the washer.

FIG. 7 shows a corresponding stack of such washers. Only the top and the bottom four spacers of such a higher stack are shown. It can be seen from this that, despite the arrangement of corresponding meshing elements 13 and also of stiffening elements 16, there is hardly an increase in the height of the stack, because the spacers 17, which are provided pursuant to the invention, ensure only that the free ends of the meshing elements 13 do not mesh with the upper side of the washer below.

Figure 8:
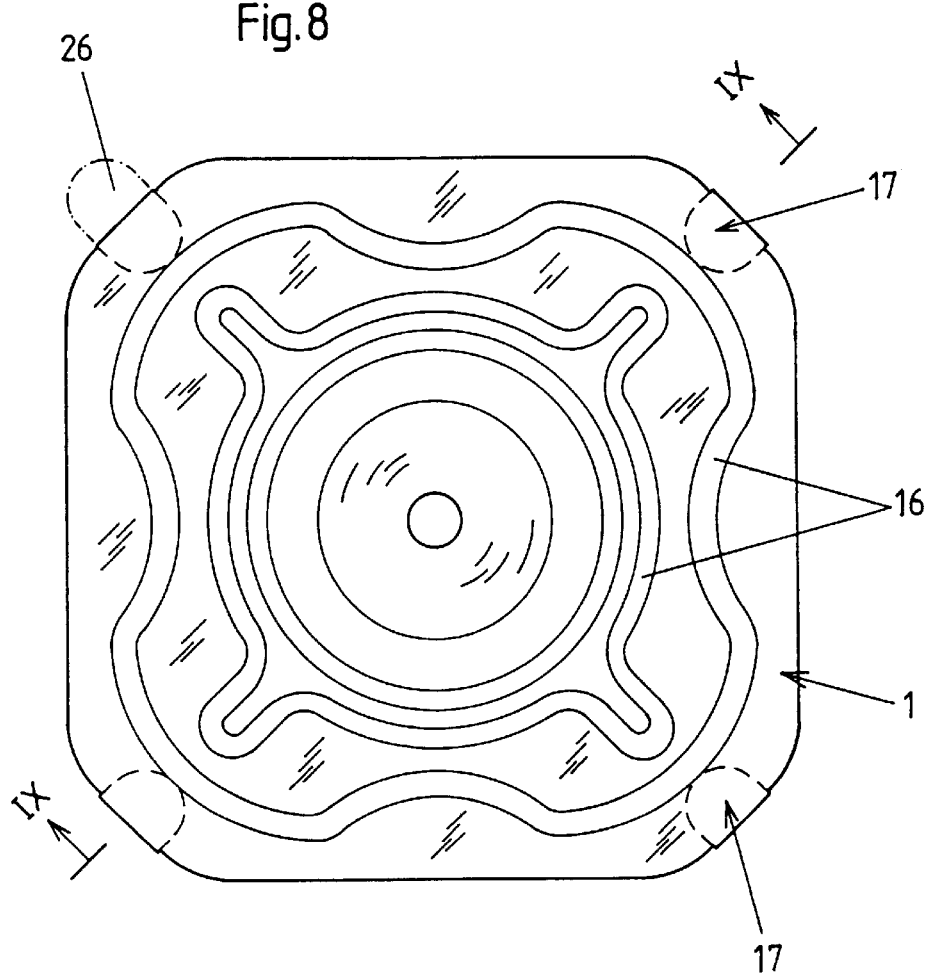
FIG. 8 shows a plan view of a different construction of a washer.
Figure 9:
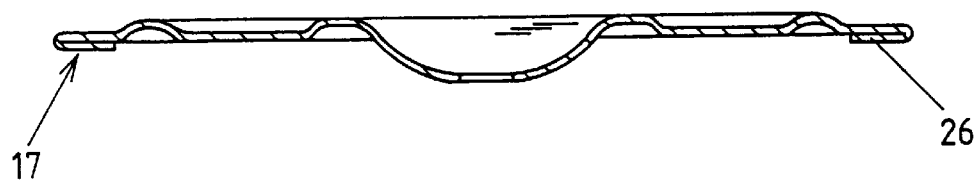
FIG. 9 shows a section along the line IX—IX of FIG. 8.
Figure 10:
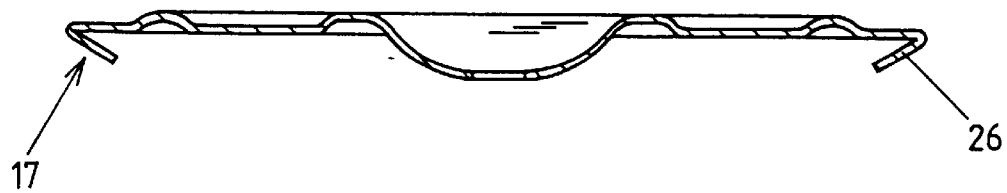
FIG. 10 shows a section similar to that of FIG. 9, in which the position of the spacer is changed.

For the embodiment of FIGS. 8 to 10, spacers 17 are provided at the outer edge of the washer 1 and moreover in the corner regions. These spacers are provided in the form of brackets, which are bent at an acute angle to the inner region of the washer 1. In other words, there are spacers 17 here, which are formed at the outer corners of bent sections or brackets 26. As can be seen from FIG. 8 at the top left, appreciable savings of material can be effected here. During the stamping process, the bracket 26 first protrudes at first to the outside and, at the same time, lies within the square enveloping the stamped-out shape, so that only scrap material, which is present anyhow, is used for the brackets 26.

The spacers 17, which are constructed at the outer edge of the washer, can be, as shown in FIG. 9, bent as a whole, so that their thickness, lying on the underside of the washer 1, can also be the height of the spacer 17. The bracket 26 can of course also be bent upward, so that it then lies on the upper side of the washer 1. The variation of the embodiment, according to which the spacers 17, constructed as brackets 26, are merely bent at an acute angle against the inner region of the washer, can be seen in FIG. 10.

For the construction of FIGS. 11 and 12, the spacers 17 are formed from sections 28 bent at the outer edge of the washer 1. Appropriately long or also several short sections 28 can be provided at the narrow sides and/or the longitudinal sides of the washer and simply bent at an acute angle inward against the inner region of the washer. An appropriate support for the washers, stacked on top of one another, is also ensured with such a variant.

For the construction of FIGS. 13 and 14, the spacers 17 are formed from separately manufactured parts 29. Merely openings in the washers 1 are prepared here. They are produced during the stamping process. The separately produced parts 28 are then held in these openings, for example, by a press fit or by elastic locking elements. Such a construction is advisable, for example, when the washer is used only sporadically for processing in processing machines and a singling is otherwise not at all necessary. The separately manufactured parts can be produced from different materials, for example, from the washer material itself or also from plastic or similar materials.

The shape of the spacers can be varied in various ways. However, they must always protrude at the upper side and/or the underside of the washer and must be effective when several washers are stacked. The spacers can be constructed in the form of brackets, cross members, elevations, knobs, pins or the like, the structural conformation of the spacers depending on the respective requirements for the processing equipment. In the case of the embodiments shown, it has always been assumed that the either spacers are present on both sides of the central opening 5 or that such spacers 17 are provided at the edge region or the outer corners of the washer. It is, however, also possible to provide appropriate measures particularly in the region of the stiffening elements, in order to bring about spacers here. It would therefore also be conceivable to provide appropriate brackets in the region of a bead or to use appropriate parts in the interior of the bead, which prevent the stacked washers being able to interlock too far, particularly in the region of the stiffening elements.

An appropriate possibility must thus always be provided for providing effective spacing when stacking several washers.

We claim:

1. A large area washer with a main body and an opening (5) for inserting a fastener (6), comprising protruding elements (13), which protrude away from the washer in the fastening direction for increasing the friction and meshing with at least one plate and a sheet (3) to be fastened, spacers (17) in the form of rectangular shaped brackets (26) bent at an oblique angle with respect to the main body of the washer, the spacers (17) extending away from the washer in the fastening direction, wherein the height (H) of the spacers (17) from a foot thereby up to the highest elevation away from the washer (1) being equal to or greater than the height (L) of the protruding elements (13) so as to enable stacking of the washers (1).

2. The washer of claim 1, wherein the bent brackets (26) and the respectively formed holes (20) in each case have a rectangular shape.

3. The washer of claim 2, wherein to form spacers (17) at two mutually opposite edges of a rectangular hole (20).

4. The washer of claim 1, wherein in each case at least one spacer (17) is constructed or disposed on either side of the opening (5) in the washer (1) for accommodating a fastener (6).

5. The washer of claim 4, wherein the opening (5) and the at least two spacers (17) lie on a common central longitudinal axis (22) of the washer.

6. The washer of claim 5, wherein an axis (27), passing through the opening (5) and the at least two spacers (17), is twisted relative to the central longitudinal axis (22) of the washer (1) by an acute angle (W3) up to about 10° and preferably by approximately 5°.

7. The washer of claim 4, wherein the distance of the two spacers (17) from the two sides of the opening (5) is different.

8. The washer of claim 1, wherein the spacers (17), constructed as brackets (26), are aligned at right angles to a plane of the washer (1).

9. The washer of claim 1, wherein the spacers (17) each constructed as a bracket (26), are inclined at an acute angle to plane of the washer (1).

10. The washer of claim 1 wherein the (17) each constructed as a bracket (26), are inclined at an acute angle to a plane of the washers (1) in the direction averted from the hole (20) formed in the washer (1).

11. The washer of claim 1, wherein the spacers (17) are formed by a section (28) bent at the outer edge of the washer (1).

12. The washer of claim 11, wherein the spacers (17) are formed by sections or brackets (26) bent at the outer corners.

13. The washer of claim 11, wherein the spacers (17), formed at the outer edge of the washer (1), are bent at an acute angle to an inner region of the washer (1).

14. The washer of claim 11, wherein the spacers (17), formed at the outer edge of the washer (1), are bent as a whole, so that a thickness thereof lying on one of the underside and the upper side of the washer (1), forms the height of the spacer (17).

15. The washer of claim 1, wherein the spacers (17) are formed by separately manufactured parts 929), which are inserted into openings (5) in the washer (1) and held by a press fit.

16. The washer of claim 1, wherein the spacers (17) are formed by separately manufactured parts (29), which are inserted into openings (5) in the washer (1) and held by an elastic locking element.

17. The washer of claim 1, wherein the washer includes corners and the protruding elements (13) include three protruding elements (13) located at each of the corners of the washer.

18. The washer of claim 1, which further includes a peripheral stiffening element (16).

19. The washer of claim 1, wherein the peripheral stiffening element(16) is a bead in the washer.

* * * * *